United States Patent [19]

Sugden

[11] Patent Number: 4,699,171

[45] Date of Patent: Oct. 13, 1987

[54] MULTIPLE PORT RELIEF VALVE

[75] Inventor: Kenneth B. Sugden, Rockford, Ill.

[73] Assignee: Sundstrand Corporation, Rockford, Ill.

[21] Appl. No.: 943,733

[22] Filed: Dec. 19, 1986

[51] Int. Cl.$^4$ ............................................. F16K 17/04
[52] U.S. Cl. .................................... 137/468; 137/506; 137/512.2
[58] Field of Search ....................... 137/468, 506, 512.2

[56] References Cited

U.S. PATENT DOCUMENTS

| | | |
|---|---|---|
| 2,630,294 | 3/1953 | Ericson et al. |
| 2,737,196 | 3/1956 | Eames |
| 2,818,711 | 1/1958 | Lincoln et al. |
| 2,898,934 | 8/1959 | Britt |
| 3,185,138 | 5/1965 | Druzynski |
| 3,419,030 | 12/1968 | Gratzmuller |
| 3,455,227 | 7/1969 | Chichester |
| 3,500,854 | 3/1970 | Altmeppen et al. |
| 3,687,154 | 8/1972 | Petersen et al. |
| 3,749,121 | 7/1973 | Frankewich |
| 3,916,946 | 11/1975 | Motzer |
| 3,967,644 | 7/1976 | St. Laurent |
| 4,278,928 | 7/1981 | Griffiths et al. |
| 4,294,278 | 10/1981 | Blake |
| 4,370,102 | 1/1983 | Sasaki ............................ 137/506 X |

Primary Examiner—Robert G. Nilson
Attorney, Agent, or Firm—Wood, Dalton, Phillips, Mason & Rowe

[57] ABSTRACT

In order to provide a multiple port relief valve which is pressure responsive in a highly effective manner so as to control communication between an inlet and a given outlet as a function of the prevailing fluid pressure, where the relief valve functions such that there is no flow at certain pressures, flow to a first outlet as a result of rapid pressure increase, and flow to a second outlet as a result of a gradual pressure increase, the relief valve includes a valve body defining a chamber having a fluid inlet and having a first fluid outlet and a second fluid outlet in fluid communication therewith. The relief valve also includes a first piston-like valve member disposed in the chamber for movement between a first position preventing fluid communication between the fluid inlet and the first fluid outlet and a second position accommodating fluid communication between the fluid inlet and the first fluid outlet. The relief valve further includes a second piston-like valve member disposed in the chamber for movement between a first position preventing fluid communication between the fluid inlet and the second fluid outlet and a second position accommodating fluid communication between the fluid inlet and the second fluid outlet. Additionally, biasing means in the valve body applies a biasing force tending to maintain at least the first piston-like valve member in the first position thereof.

40 Claims, 4 Drawing Figures

MULTIPLE PORT RELIEF VALVE

FIELD OF THE INVENTION

This invention relates to a relief valve, and more specifically, to a multiple port relief valve in which the operative outlet depends upon the pressure build-up rate.

BACKGROUND OF THE INVENTION

In many constant speed drive systems, the need exists for an overpressure relief valve capable of discharging relief valve flows to multiple outlets depending upon pressure build-up rates. In particular, relief valves for oil systems are required between the unit scavenge pump and scavenge filter and also between the scavenge filter and the oil out boss. For instance, overpressure relief valves are commonly required for constant speed drive systems of the types utilized for a variety of applications such as in aircraft.

With regard to an overpressure relief valve utilized between the unit scavenge pump and the scavenge filter, such a valve relieves overpressure as a result of excessive flow resistance in the scavenge filter and/or downstream of the scavenge filter. The overpressure relief valve located between the scavenge filter and the oil out boss, on the other hand, typically relieves overpressure as a result of excessive flow resistance in the external cooling system. While a number of factors can produce an excessive flow resistance, the two most common are a reduced flow area due to filter plugging or high oil viscosity due to cold oil.

Generally, it is recognized that the oil relieved during these two conditions would provide more desirable performance if vented to two different locations in the system. For instance, during cold start tests, it has been determined that directing the filter overpressure relief valve overflow back to the inlet of the unit scavenge pump provides improved startability because this flow helps to decongeal and self-prime the scavenge pump. However, it has been suggested that relieving this overflow to the inlet of the unit scavenge pump during filter plugging sitautions may cause localized overheating, loss of charge pressure, and subsequent unit damage.

For plugged filter situations, it could be desirable to direct this overflow to a sump where temperature detectors could cause a shutdown of the constant speed drive system or to the inlet of the constant speed drive system to eliminate a loss of charge pressure. The specific routing for different applications will depend on individual system design. In any event, it is generally recognized that a multiple port relief valve is required which allows discharge of relief valve overflows to more than one location based on the pressure build-up rate and/or temperature of the oil and environment.

Among the attempts to provide a relief valve is that disclosed in Chichester U.S. Pat. No. 3,455,322. The relief valve disclosed therein is a pressure compensated diverter valve for lift systems with hydraulic pumps to relieve system pressure during pressure surges wherein there is always flow through a fluid outlet passage. Blake U.S. Pat. No. 4,294,278 discloses a pressure modulating valve whereby a fluid supplied to clutches is modulated from a low pressure to a high pressure to provide smooth clutch engagement. The modulating valve includes a discharging port for supplying a fluid under pressure to clutches and a pair of discharging ports in communication with a sump. Among other attempts to provide valves for various applications are those disclosed in U.S. Pat. Nos. 2,630,294; 2,737,196; 2,818,711; 2,898,934; 3,185,138; 3,419,030; 3,500,854; 3,687,154; 3,749,121; 3,916,946; 3,967,644 and 4,278,928.

In practice, it has remained to provide a multiple drain relief valve which is pressure responsive in a highly effective manner so as to control communication between an inlet and a given outlet as a function of the prevailing fluid pressure. While accomplishing such objectives, it is desirable to provide a relief valve which functions such that there is no flow at certain pressures, flow to a first outlet as a result of a rapid pressure increase, and flow to a second outlet as a result of a gradual pressure increase. Further, it is desirable to provide a relief valve for utilization in a constant speed drive system of the type found in a variety of applications including those commonly provided for aircraft.

The present invention is directed to overcoming the above stated problems and accomplishing the stated objects.

SUMMARY OF THE INVENTION

It is a principal object of the present invention to provide a new and improved relief valve. More specifically, it is an object of the invention to provide a multiple port relief valve whereby a rapid increase in pressure in the fluid inlet permits fluid to flow from the fluid inlet to a first fluid outlet. It is likewise an object of the invention to provide a multiple port relief valve whereby a gradual increase in pressure in the fluid inlet permits fluid to flow from the fluid inlet to a second fluid outlet.

An exemplary embodiment of the invention achieves the foregoing objects in a multiple port relief valve comprising a valve body defining a chamber having a fluid inlet and having a first fluid outlet and a second fluid outlet in fluid communication therewith. The relief valve also includes a first piston-like valve member disposed in the chamber for movement between a first position preventing fluid communication between the fluid inlet and the first fluid outlet and a second position accommodating fluid communication between the fluid inlet and the first fluid outlet. The relief valve further includes a second piston-like valve member disposed in the chamber for movement between a first position preventing fluid communication between the fluid inlet and the second fluid outlet and a second position accommodating fluid communication between the fluid inlet and the second fluid outlet. Additionally, biasing means in the valve body applies a biasing force tending to maintain at least the first piston-like valve member in the first position thereof.

In the exemplary embodiment, the first and second piston-like valve members move together against the biasing means when the first piston-like valve member moves from its first position to its second position. Similarly, the first and second piston-like valve members move away from one another when the second piston-like valve member moves from its first position to its second position.

With this construction, the first and second piston-like valve members are in selective fluid communication with the fluid inlet. More specifically, the first and second piston-like valve members are preferably slidably mounted for reciprocating movement within a generally cylindrical portion of the chamber and are related such that the fluid inlet is either directly or indirectly in selective fluid communication with either or both of the first and second piston-like valve members. As a result, fluid pressure in the fluid inlet is utilized to drive the first and second piston-like valve members from the first to the second positions thereof.

In a preferred embodiment, the chamber in the valve body includes a generally cylindrical portion in direct fluid communication with the fluid inlet and an enlarged cavity portion in direct fluid communication with the generally cylindrical portion in remote relation to the fluid inlet. Still more specifically, the fluid inlet, generally cylindrical portion, and enlarged cavity portion are preferably disposed in generally coaxial relation and the enlarged cavity portion is also generally cylindrical in cross-section with the first and second fluid outlets being in direct fluid communication with the generally cylindrical portion of the chamber. Moreover, the biasing means preferably includes a spring disposed within the enlarged cavity portion of the chamber to apply the biasing force against at least one of the first and second piston-like valve members tending to maintain at least the first piston-like valve member in the first position thereof.

Other details of the preferred embodiment include the second piston-like valve member having an axial extension disposed in the enlarged cavity portion with the spring applying the biasing force against the axial extension. With this arrangement, means are provided for retaining the spring in the enlarged cavity portion in a position tending to maintain at least the first piston-like valve member in the first position thereof. Additionally, the valve body preferably includes a fluid vent in direct fluid communication with the enlarged cavity portion and the axial extension of the second piston-like valve member preferably includes a radial flange dimensioned larger than the generally cylindrical portion of the chamber.

With this construction, the spring normally urges the radial flange into engagement with a wall of the enlarged cavity portion disposed generally transversely about the generally cylindrical portion of the chamber. In addition, the spring retaining means advantageously includes a threaded cap to be disposed in coaxial relation to the fluid inlet, generally cylindrical portion, and enlarged cavity portion. With this construction, the threaded cap is adapted to cooperate with mating threads in an opening leading into the enlarged cavity portion of the chamber to retain the spring between the generally transverse wall and the threaded cap.

Other objects, advantages and features of the present invention will become apparent from the following specification taken in connection with the accompanying drawings.

DESCRIPTION OF THE PREFERRED EMBODIMENTS

Figure 1:
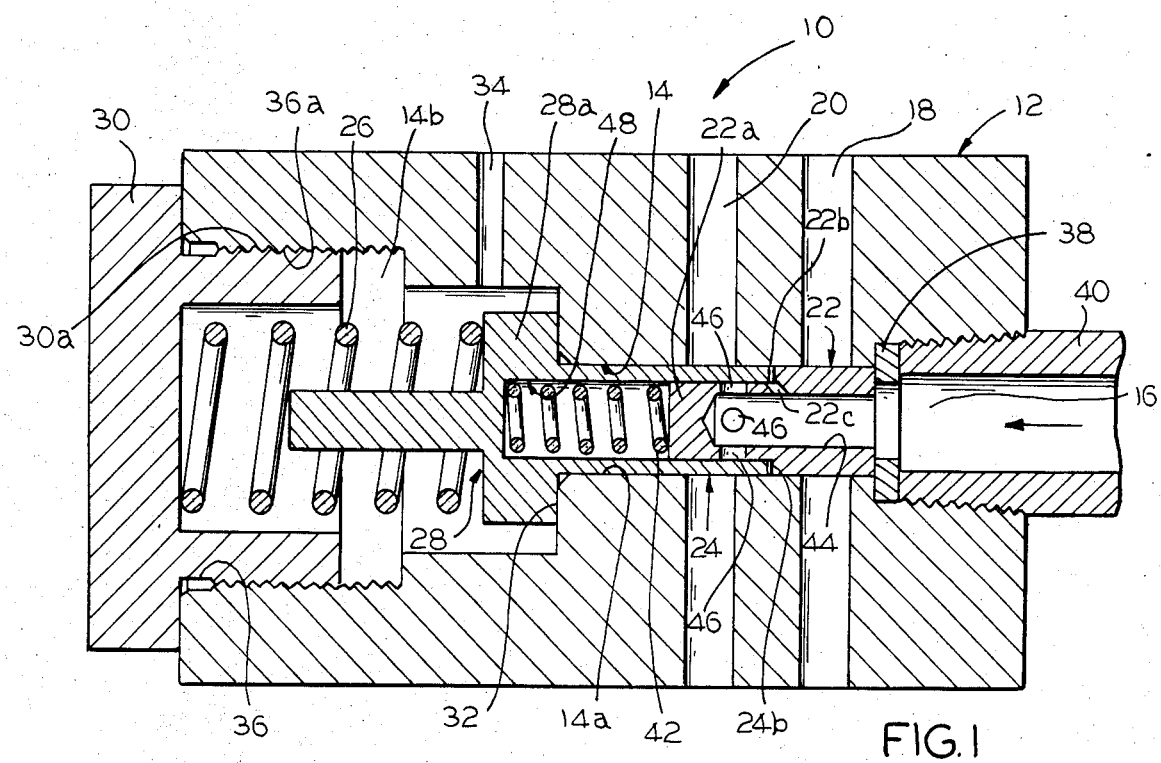
FIG. 1 is a cross-sectional view of a multiple port relief valve in accordance with the present invention.

An exemplary embodiment of a multiple port relief valve in accordance with the invention is illustrated in FIG. 1. The relief valve 10 includes a valve body 12 defining a chamber 14 having a fluid inlet 16 and having a first fluid outlet 18 and a second fluid outlet 20 in fluid communication therewith. A first piston-like valve member 22 is disposed in the chamber 14 for movement between a first position (as shown) preventing fluid communication between the fluid inlet 16 and the first fluid outlet 18. A second piston-like valve member 24 is disposed in the chamber 14 for movement between a first position (as shown) preventing fluid communication between the fluid inlet 16 and the second fluid outlet 20 and a second position accommodating fluid communication between the fluid inlet 16 and the second fluid outlet 20. The relief valve 10 further includes biasing means such as the spring 26 in the valve body 12 applying a biasing force tending to maintain at least the first piston-like valve member 22 in the first position thereof. With this construction, the first and second piston-like valve members 22 and 24 are in selective fluid communication with the fluid inlet 16, as will be described in detail hereinafter.

Still referring to FIG. 1, the first and second piston-like valve members 22 and 24 move together against the biasing of the spring 26 when the first piston-like valve member 22 moves from its first position to its second position. Also, the first and second piston-like valve members 22 and 24 move away from one another when the second piston-like valve member 24 moves from its first position to its second position.

As shown, the chamber 14 in the valve body 12 includes a generally cylindrical portion 14a in direct fluid communication with the fluid inlet 16 and an enlarged cavity portion 14b in direct fluid communication with the generally cylindrical portion 14a and in remote relation to the fluid inlet 16. It will be appreciated that the fluid inlet 16 and the generally cylindrical portion 14a and enlarged cavity portion 14b of the chamber 14 are disposed in generally coaxial relation with the enlarged cavity portion 14b also preferably being generally cylindrical in cross-section. In the embodiment illustrated in FIG. 1, the first and second fluid outlets 18 and 20 are in direct fluid communication with the generally cylindrical portion 14a of the chamber 14 and are in indirect fluid communication with the fluid inlet 16 depending upon the relative positions of the first and second piston-like valve members 22 and 24.

As will be appreciated, the first and second piston-like valve members 22 and 24 are slidably mounted for reciprocating movement within the generally cylindrical portion 14a of the chamber 14, and the biasing means or spring 26 is disposed within the enlarged cavity portion 14b to apply the biasing force against at least one of the first and second piston-like valve members 22 and 24. In the embodiment illustrated in FIG. 1, the second piston-like valve member 24 includes an axial extension 28 disposed in the enlarged cavity portion 14b of the chamber 14 and the spring 26 applies the biasing force against the axial extension 28 to urge the first and second piston-like valve members 22 an 24 toward the first positions thereof.

As shown, the relief valve 10 includes means such as the threaded cap 30 for retaining the spring 26 in the enlarged cavity portion 14b of the chamber 14. In this connection, the axial extension 28 of the second piston-like valve member 24 preferably includes a radial flange 28a dimensioned larger than the generally cylindrical portion 14a and disposed such that the spring 26 normally urges the radial flange 28a into engagement with a wall 32 of the enlarged cavity portion 14b disposed generally transversely about the generally cylindrical portion 14a of the chamber 14. Additionally, the valve body 12 preferably includes a fluid vent 34 in direct fluid communication with the enlarged cavity portion 14b of the chamber 14.

Still referring to FIG. 1, the threaded cap 30 is preferably disposed in coaxial relation to the fluid inlet 16 and the generally cylindrical portion 14a and enlarged cavity portion 14b of the chamber 14. It will be appreciated that the threaded cap 30 has threads 30a adapted to cooperate with mating threads 36a in an opening 36 leading into the enlarged cavity portion 14b of the chamber 14. With this construction, the first piston-like valve member 22, second piston-like valve member 24, and spring 26 can be placed in position through the opening 36 and thereafter retained in position by utilizing the threaded cap 30.

With regard to the relative cooperation of the first and second piston-like valve members 22 and 24, the spring 26 applies a biasing force tending to maintain the first piston-like valve member 22 in the first position thereof by acting against the second piston-like valve member to urge the first piston-like valve member 22 against a ring 38 retained within the fluid inlet 16 by threaded fitting 40. It is because of this arrangement that the first and second piston-like valve members 22 and 24 move together against the spring 26 when the first piston-like valve member 22 moves from the first position (as illustrated) to the second position (with the fluid inlet 16 in direct fluid communication with the first fluid outlet 18). Also, second biasing means such as the spring 42 is provided in the valve body 12 to apply a biasing force tending to move the second piston-like valve member 24 toward the second position thereof by acting against the first piston-like valve member 22 to urge the second piston-like valve member 24 in a direction opposite the biasing force of the spring 26. It is because of this arrangement that the first and second piston-like valve members 22 and 24 move away from one another when the second piston-like valve member 24 moves from the first position (as illustrated) to the second position (with the fluid inlet 16 in indirect fluid communication through the first piston-like valve member 22 with the second fluid outlet 20). Moreover, the biasing force of the first biasing means or spring 26 will be greater than the biasing force of the second biasing means or spring 42 to accomplish the objectives of the invention, as will be described in greater detail hereinafter.

As shown in FIG. 1, the first piston-like valve member 22 is in direct fluid communication with the fluid inlet 16. It will also be appreciated that the second piston-like valve member 24 is in fluid communication with the fluid inlet 16 through the first piston-like valve member 22 which includes an axial bore 44 facing the fluid inlet 16 and preferably a plurality of radial bores 46 in a reduced diameter portion 22a which, in turn, are in direct fluid communication with the axial bore 44. With this arrangement, the radial bores 46 permit fluid to flow from the fluid inlet 16, through the axial bore 44 and radial bores 46 and to the second fluid outlet 20 when the second piston-like valve member 24 has moved independently of the first piston-like valve member 22 to the second position thereof.

An additional feature of the embodiment illustrated in FIG. 1 includes the second piston-like valve member 24 having an elongated axial bore 48 facing the first piston-like valve member 22. It will be seen that the second biasing means or spring 42 is disposed within the elongated axial bore 48 to apply the biasing force tending to move the second piston-like valve member 24 toward the second position thereof independently of the first piston-like valve member 22. Moreover, the reduced diameter axially extending portion 22a of the first piston-like valve member 22 is adapted to be slidably disposed within the elongated axial bore 48 in the second piston-like valve member 24, as illustrated.

With this arrangement, the spring 42 in the elongated axial bore 48 in the second piston-like valve member 24 acts against the first piston-like valve member 22. This tends to move the second piston-like valve member 24 to the second position thereof. However, this occurs only when there is a gradual rise in pressure in the fluid inlet 16, as will be described in detail hereinafter.

Still referring to FIG. 1, the first and second piston-like valve members 22 and 24 include respective shoulder portions 22b and 24b disposed in abutting relation in the first positions thereof. The shoulder portions are disposed in spaced relation to permit the radial bores 46 to be in fluid communication with the second fluid outlet 20 when the second piston-like valve member 24 has moved independently of the first piston-like valve member 22 to the second position thereof. Additionally, in one embodiment, the first piston-like valve member 22 includes a fluid passage 22c extending from the axial bore 44 in the first piston-like valve member 22 to the abutting shoulder portions 22b and 24b to supply fluid pressure thereto.

With the fluid passage 22c, a gradual increase in pressure in the fluid inlet 16 is transferred to the second piston-like valve member 24 at the abutting shoulder portions 22b and 24b, although the fluid passage 22c can be eliminated in which case leakage through the radial bores 46 alone into the elongated axial bore 48 of the second piston-like valve member 24 will take place in the event there is a gradual increase in pressure in the fluid inlet 16. In either event, the gradual increase in pressure in the fluid inlet 16 is transferred to the second piston-like valve member 24 through either or both of the fluid passage 22c and the radial bores 46 such that the combined force of the spring 42 and the fluid pressure causes the second piston-like valve member 24 to move independently of the first piston-like valve member 22 from the first position to the second position thereof to permit fluid to flow through the first piston-like valve member 22 into the second fluid outlet 20.

In an alternative embodiment (see FIG. 2), most of the major components are identical in construction to the corresponding components of the embodiment illustrated in FIG. 1. It will be seen, for instance, that the multiple port relief valve 110 comprises a valve body 112 defining a chamber 114 having a fluid inlet 116 and having a first fluid outlet 118 and a second fluid outlet 120 in fluid communication therewith, as well as a first piston-like valve member 122 disposed in the chamber 114 for movement between a first position preventing fluid communication between the fluid inlet 116 and the first fluid outlet 118 (as shown) and a second position accommodating fluid communication between the fluid inlet 116 and the first fluid outlet 118 and a second piston-like valve member 124 disposed in the chamber 114 for movement between a first position preventing fluid communication between the fluid inlet 116 and the second fluid outlet 120 (as shown) and a second position accommodating fluid communication between the fluid inlet 116 and the second fluid outlet 120. In addition, the relief valve 110 includes biasing means such as the spring 126 in the valve body 112 applying a biasing force tending to maintain at least the first piston-like valve member 12 in the first position thereof.

Figure 2:
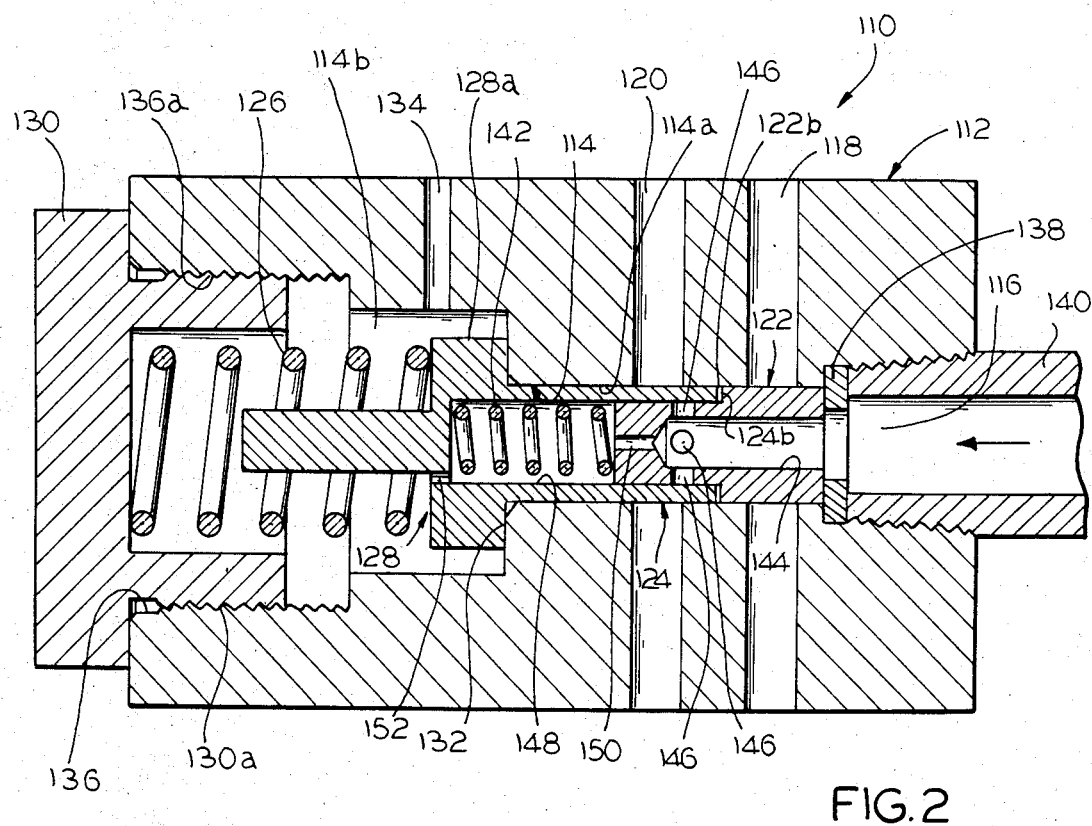
FIG. 2 is a cross-sectional view of a first alternative embodiment of the multiple port relief valve of FIG. 1.

Still referring to FIG. 2, the first and second piston-like valve members 122 and 124 move together against the biasing means or spring 126 when the first piston-like valve member 122 moves from the first position to the second position. Moreover, the first and second piston-like valve members 122 and 124 move away from one another by reason of the biasing force of the spring 142 in the elongated axial bore 148 and the force of the fluid pressure in the elongated axial bore 148, as will be described in detail hereinafter.

As shown, the multiple port relief valve 110 also includes a generally cylindrical portion 114a and an enlarged cavity portion 114b defining the chamber 114, the second piston-like valve member 124 includes an axial extension 128 having a radial flange 128a dimensioned larger than the generally cylindrical portion 114a of the chamber 114 so that the spring 126 normally urges the radial flange 128a into engagement with the wall 132, the valve body 112 includes a threaded cap 130 having threads 130a adapted to cooperate with mating threads 136a in the opening 136, the first piston-like valve member 122 is normally urged into engagement with a ring 138 held in position in the fluid inlet 116 by means of a fitting 140, and the first piston-like valve member 122 includes an axial bore 144 communicating with the fluid inlet 116 and a plurality of radial bores 146.

As will be appreciated, the components described are similar or identical in construction to the corresponding components in FIG. 1. There are, however, certain differences with regard to the exact construction of the first and second piston-like valve members 122 and 124 and the specific materials chosen for the springs 126 and 142. Accordingly, only the differences in these components will be discussed in detail in connection with the embodiment in FIG. 2.

As shown, the first piston-like valve member 122 includes an axial fluid passage 150 extending from the axial bore 144 completely through the first piston-like valve member 122 to permit the elongated axial bore 148 in the second piston-like valve member to be in direct fluid communication with the fluid inlet 116. This is in contrast to the embodiment of FIG. 1 in which fluid pressure is directed through the fluid passage 22c to act against the shoulder portion 24c normally in abutment with the shoulder portion 22b and/or fluid pressure leaks between the first and second piston-like valve members 22 and 24 through the radial bores 46 into the elongated axial bore 48. While the shoulder portions 122b and 124b are still normally in abutment in FIG. 2, the second piston-like valve member 124 moves independently of the first piston-like valve member 122 from the first position to the second position as a gradual increase in pressure in the fluid inlet 116 is transferred to the elongated axial bore 148 of the second piston-like valve member 124 through the fluid passage 150.

Still referring to FIG. 2, a fluid passage 152 extends from the elongated axial bore 148 completely through the second piston-like valve member 124 to permit the enlarged cavity portion 114b to be in direct fluid communication with the fluid inlet 116. More specifically, the enlarged cavity portion 114b is in fluid communication through the axial bore 144 and the axial fluid passage 150 in the first piston-like valve member 122 and through the elongated axial bore 148 and the fluid passage 152 in the second piston-like valve member 124, and this permits fluid, such as oil, to eventually fill the entire chamber 114 and, of course, the portion filling the enlarged cavity portion 114b is drained through the vent 134. By utilizing a shape memory metal for the springs 126 and 142, where the springs 126 and 142 apply a greater biasing force as fluid temperature increases, the operating characteristics of the multiple port relief valve 112 can be varied from that illustrated in FIG. 1.

In operation of the FIG. 1 embodiment, scavenge oil pressure is initially transmitted to the inlet end of the first piston-like valve member 22 as indicated by the arrow. During a rapid increase in pressure which is typical of a cold start overpressure condition, the fluid pressure at the inlet end of the first piston-like valve member 22 will act to move both the first and second piston-like valve members 22 and 24 against the biasing force of the spring 26. The first piston-like valve member 22 will stop when the first fluid outlet 18 in the valve body 12 is exposed such that the oil flowing through the fluid outlet 18 causes the resulting fluid pressure to balance the biasing force of the spring 26. At this point, the abutting shoulder portions 22b and 24b will be aligned with the second fluid outlet 20 which will normally be at a lower pressure than the fluid pressure in the fluid inlet 16 assuring that the combined effect of the fluid pressure on the first piston-like valve member 22 and the biasing force of the spring 26 on the second piston-like valve member 24 will maintain the shoulder portions 22b and 24b in abutting relation. As a result, the multiple port relief valve 10 continues to relieve fluid pressure through the first fluid outlet 18 until the fluid pressure can no longer balance the biasing force of the spring 26 at which time both the first and second piston-like valve members 22 and 24 move back toward the fluid inlet 16 once again closing the first fluid outlet 18 with the first piston-like valve member 22 in engagement with the ring 38, as illustrated.

During a gradual increase in pressure which is typical of a plugging filter, the areas between the first and second piston-like valve members 22 and 24 also build up in pressure because of the leakage through the radial bores 46 and/or fluid pressure through the fluid passage 22c. The first piston-like valve member 22 is maintained in engagement with the ring 38 by this gradual increase in pressure in combination with the biasing force of the spring 42, and the gradual increase in pressure fills the elongated axial bore 48 with oil to provide fluid pressure to act with the spring 42 to move the second piston-like valve member 24 independently of the first piston-like valve member 22 against the biasing force of the spring 26. As a result, the radial bores 46 in the first piston-like valve member 22 are disposed in communication with the second fluid outlet 20 to relieve overpressure by allowing oil to flow into the second fluid outlet 20. The relief valve 10 continues to relieve through the second outlet 20 until the fluid pressure in combination with the biasing force of the spring 42 can no longer balance the biasing force of the spring 26 at which time the second piston-like valve member 24 moves back toward the fluid inlet 16 until the shoulder portions 22b and 24b are again in abutment once again closing the second fluid outlet 20.

In operation of the FIG. 2 embodiment, scavenge oil pressure is again initially transmitted to the inlet end of the first piston-like valve member 122 as indicated by the arrow. During a rapid increase in pressure which is typical of a cold start overpressure condition, the fluid pressure at the inlet end of the first piston-like valve member 122 will act to move both the first and second piston-like valve members 122 and 124 against the biasing force of the spring 126. The first piston-like valve member 122 will stop when the first fluid outlet 118 in the valve body 112 is exposed such that the oil flowing through the first fluid outlet 118 causes the resulting fluid pressure to balance the biasing force of the spring 126. At this point, the abutting shoulder portions 122b and 124b will be aligned with the second fluid outlet 120 which will normally be at a lower pressure than the fluid pressure in the fluid inlet 116 assuring that the combined effect of the fluid pressure on the first piston-like valve member 122 and the biasing force of the spring 126 on the second piston-like valve member 124 will maintain the shoulder portions 122b and 124b in abutting relation. As a result, the multiple port relief valve 110 continues to relieve fluid pressure through the first fluid outlet 118 until the fluid pressure can no longer balance the biasing force of the spring 126 at which time both the first and second piston-like valve members 122 and 124 move back toward the fluid inlet 116 once again closing the first fluid outlet 118 with the first piston-like valve member 122 in engagement with the ring 138, as illustrated.

Additionally, in the FIG. 2 embodiment, the high viscosity oil in a cold start overpressure condition helps to keep the first and second piston-like valve members 122 and 124 together due to hydraulic lock.

During a gradual increase in pressure which is typical of a plugging filter, the areas between the first and second piston-like valve members 122 and 124 also build up in pressure because of oil flow through the fluid passage 150 and/or leakage through the radial bores 146. The first piston-like valve member 122 is maintained in engagement with the ring 138 by this gradual increase in pressure in combination with the biasing force of the spring 142, and the gradual increase in pressure fills the elongated axial bore 148 with oil to provide fluid pressure to act with the spring 142 to move the second piston-like valve member 124 independently of the first piston-like valve member 122 against the biasing force of the spring 126. As a result, the radial bores 146 in the first piston-like valve member 122 are disposed in communication with the second fluid outlet 120 to relieve overpressure by allowing oil to flow into the second fluid outlet 120. The relief valve 110 continues to relieve through the second outlet 120 until the fluid pressure in combination with the biasing force of the spring 142 can no longer balance the biasing force of the spring 126 coupled with gradually increasing fluid pressure in the enlarged cavity portion 114b of the chamber 114 caused by the flow of oil through the fluid passage 152 at which time the second piston-like valve member 124 moves back toward the fluid inlet 116 until the shoulder portions 122b and 124b are again in abutment once again closing the second fluid outlet 120.

In the FIG. 2 embodiment, the springs 126 and 142 are preferably formed of a shape memory metal in which the spring force is designed to be low at cold start temperature conditions which has the additional benefit that lower pressures may be seen and relieved through the first fluid outlet 118 during cold starts without affecting the relief of high pressures that will be seen through the second fluid outlet 120 during filter plugging. In this connection, the oil flow through the fluid passages 150 and 152 are designed for quick response of the springs 126 and 142 to oil temperature, if required, e.g., during filter plugging. Preferably, the springs 126 and 142 undergo a martensite to austenite transformation whereby the spring force increases by reason of a tendency to revert to the earlier defined configuration, i.e., the position of the springs 126 and 142 when the first and second piston-like valve members 122 and 124 are in the positions illustrated in FIG. 2.

Figure 3:
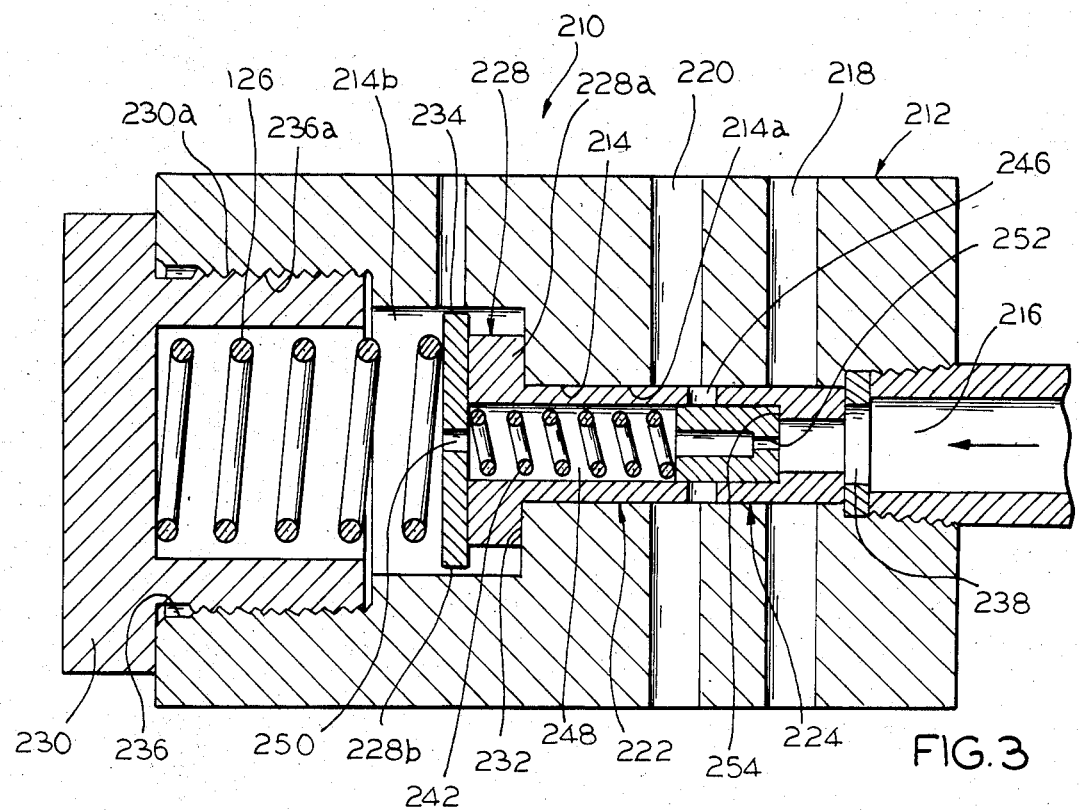
FIG. 3 is a cross-sectional view of a second alternative embodiment of the multiple port relief valve of FIG. 1.

Referring to FIG. 3, the multiple port relief valve 210 represents another alternative embodiment in which the major components are similar in construction to the corresponding components of the embodiments illustrated in FIGS. 1 and 2. It will be seen, for instance, that the multiple port relief valve 210 comprises a valve body 212 defining a chamber 214 having a fluid inlet 216 and having a first fluid outlet 218 and a second fluid outlet 220 in direct fluid communication therewith, as well as a first piston-like valve member 222 disposed in the chamber 214 for movement between a first position preventing fluid communication between the fluid inlet 216 and the first fluid outlet 218 and a second position accommodating fluid communication between the fluid inlet 216 and the first fluid outlet 218 and a second piston-like valve member 224 disposed in the chamber 214 for movement between a first position preventing fluid communication between the fluid inlet 216 and the second fluid outlet 220 and a second position accommodating fluid communication between the fluid inlet 216 and the second fluid outlet 220. In addition, the relief valve 210 includes first biasing means such as the spring 226 in the valve body 212 applying a biasing force tending to maintain the first piston-like valve member 222 in the first position thereof and second biasing means such as the spring 242 in the valve body 212 applying a biasing force tending to maintain the second piston-like valve member 224 in the first position thereof.

Still referring to FIG. 3, the first and second piston-like valve members 222 and 224 move together against the biasing means or spring 226 when the first piston-like valve member 222 moves from the first position to the second position thereof. It will also be appreciated that the second piston-like valve member 224 moves relative to the first piston-like valve member 222 when the second piston-like valve member 224 moves independently against the biasing force of the spring 242 from the first position to the second position thereof. In this connection, the biasing force of the first biasing means or spring 226 is greater than the biasing force of the second biasing means or spring 242.

As shown, the multiple port relief valve 210 also includes a generally cylindrical portion 214a and an enlarged cavity portion 214b defining the chamber 214, the first piston-like valve member 222 includes an elongated axial bore 248, and the first and second piston-like valve members 222 and 224 are in fluid communication with the fluid inlet 216 through the second piston-like valve member 224. It will be seen that the generally cylindrical portion 214a and the enlarged cavity portion 214b are disposed in generally coaxial relation and the enlarged cavity portion 214b is generally cylindrical in cross-section with the first and second fluid outlets 218 and 220 being in direct fluid communication with the generally cylindrical portion 214a. Also, as shown, the first piston-like valve member 222 is slidably mounted for reciprocating movement within the generally cylindrical portion 214a with the first piston-like valve member 222 being disposed such that the elongated axial bore 248 faces the fluid inlet 216 and with the second piston-like valve member 224 being slidably mounted for reciprocating movement within the elongated axial bore 248 in the first piston-like valve member 222.

Still referring to FIG. 3, the spring 226 is disposed within the elongated cavity portion 214b to apply the biasing force to the axial extension 228. It will also be seen and appreciated that the spring 242 is disposed within the elongated axial bore 248 to apply the biasing force tending to maintain the second piston-like valve member 224 in the first position thereof. As shown, the second piston-like valve member 224 includes an axial bore 252 facing the fluid inlet 216 and the first piston-like valve member 222 has at least one radial bore 246 normally blocked by the second piston-like valve member 224 from communication with the fluid inlet 216.

With this construction, the radial bore 246 permits fluid to flow from the fluid inlet 216 and into the second fluid outlet 220 when the second piston-like valve member 224 has moved independently of the first piston-like valve member 222 to the second position thereof. It will also be seen that an axial fluid passage 250 extends from the elongated axial bore 248 completely through the first piston-like valve member 222 to permit the enlarged cavity portion 214b of the chamber 214 to be in fluid communication with the fluid inlet 216 through the axial bore 252 in the second piston-like valve member 224 and the elongated axial bore 248 in the first piston-like valve member 222. Moreover, as shown, the first piston-like valve member 222 includes a raidally inwardly projecting shoulder 254 for retaining the second piston-like valve member 224 within the elongated axial bore 248.

Still other details of the embodiment of FIG. 3 include the fact that the axial extension 228 of the second piston-like valve member 224 includes a radial flange 228a dimensioned larger than the generally cylindrical portion 214a of the chamber 214 so that the spring 226 normally urges the radial flange 228a into engagement with the wall 232. It will also be seen that the valve body 212 includes a threaded cap 230 having threads 230a adapted to cooperate with mating threads 236a in the opening 236 in the valve body 212 which retains the spring 226 in position so as to bear against a cap 228b integrally associated with the radial flange 228a and having the fluid passage 250 therein. Moreover, since fluid such as oil eventually fills the entire chamber 214, the portion filling the enlarged cavity portion 214b is drained through the vent 234.

In operation of the FIG. 3 embodiment, scavenge oil pressure is initially transmitted to the inlet end of the first and second piston-like valve members 222 and 224 as indicated by the arrow. During a rapid increase in pressure which is typical of a cold start overpressure condition, the fluid pressure at the inlet end of the first and second piston-like valve members 222 and 224 will act to move both the first and second piston-like valve members 222 and 224 against the biasing force of the spring 226. The first piston-like valve member 222 will stop when the first fluid outlet 218 in the valve body 212 is exposed such that the oil flowing through the fluid outlet 218 causes the resulting fluid pressure to balance the biasing force of the spring 226. At this point, the second piston-like valve member 224 will be in abutment with the shoulder 254 of the first piston-like valve member 222 precluding any communication of the fluid inlet 216 with the fluid outlet 220 by closing off the radial bores 246. As a result, the multiple port relief valve 210 continues to relieve fluid pressure through the first fluid outlet 218 until the fluid pressure can no longer balance the biasing force of the spring 226 at which time both the first and second piston-like valve members 222 and 224 move back toward the fluid inlet 216 once again closing the first fluid outlet 218 with the first piston-like valve member 222 in engagement with the ring 238, as illustrated.

As will be appreciated, if the biasing force of the spring 242 is less than the biasing force of the spring 226, the second piston-like valve member 224 will move to the second position to allow fluid to flow from the fluid inlet 216, through the elongated axial bore 248 in the first piston-like valve member 222, and through the radial bore 246 in the first piston-like valve member 222 into the second fluid outlet 220. This will occur as soon as fluid in the elongated axial bore 248 is displaced through the fluid passage 250 into the enlarged cavity portion 214b to balance the fluid pressure in the elongated axial bore 248 and the enlarged cavity portion 214b by reason of which there is a delaying action. As a result, when the fluid is high viscosity oil, the first fluid outlet 218 can be utilized as an overflow to decongeal the scavenge pump inlet during cold starts and for subsequent conditions such as hot overpressures the oil can be drained to a more suitable location through the second fluid outlet 220.

Figure 4:
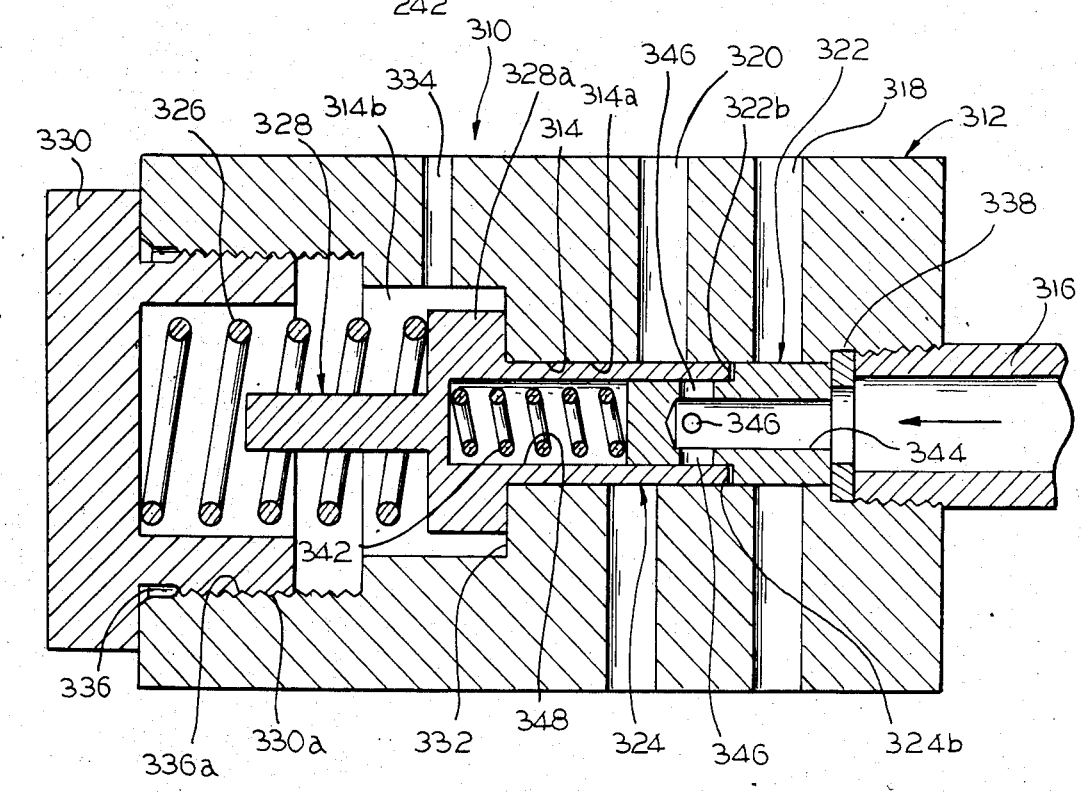
FIG. 4 is a cross-sectional view of a third alternative embodiment of the multiple port relief valve of FIG. 1.

Referring to FIG. 4, the multiple port relief valve 310 represents still another alternative embodiment in which the major components are similar in construction to the corresponding components of the embodiments illustrated in FIGS. 1–3. It will be seen, for instance, that the multiple port relief valve 310 comprises a valve body 312 defining a chamber 314 having a fluid inlet 316 and having a first fluid outlet 318, a second fluid outlet 320 and a third fluid outlet 356 in direct fluid communication therewith, as well as a first piston-like valve member 322 disposed in the chamber 314 for movement between a first position preventing fluid communication between the fluid inlet 316 and the first fluid outlet 318 and a second position accommodating fluid communication between the fluid inlet 316 and the first fluid outlet 318 and a second piston-like valve member 324 disposed in the chamber 314 for movement between a first position preventing fluid communication between the fluid inlet 316 and the second and third fluid outlets 320 and 356, a second position accommodating fluid communication between the fluid inlet 316 and the second fluid outlet 320, and a third position accommodating fluid communication between the fluid inlet 316 and the second and third fluid outlets 320 and 356. In addition, the relief valve 310 includes first biasing means such as the spring 326 in the valve body 312 applying a biasing force tending to maintain the first piston-like valve member 322 in the first position thereof and second biasing means such as the spring 342 in the valve body 312 applying a biasing force tending to maintain the second piston-like valve member 324 in the first position thereof.

Still referring to FIG. 4, the first and second piston-like valve members 322 and 324 move together against the biasing means or spring 326 when the first piston-like valve member 322 moves from the first position to the second position thereof. It will also be appreciated that the second piston-like valve member 324 moves relative to the first piston-like valve member 322 when the second piston-like valve member 324 moves independently against the biasing force of the spring 326 from the first position to the second and third positions thereof. In this connection, the biasing force of the first biasing means or spring 326 is greater than the biasing force of the second biasing means or spring 342.

As shown, the multiple port relief valve 310 also includes a generally cylindrical portion 314a and an enlarged cavity portion 314b defining the chamber 314, the first piston-like valve member 322 includes an axial bore 344 and a plurality of radial bores 346, and the bores 344 and 346 communicates with the fluid inlet 316. Moreover, the spring 342 is disposed in an elongated axial bore 348 and the generally cylindrical portion 314a and enlarged cavity portion 314b are disposed in generally coaxial relation with the enlarged cavity portion 314b being generally cylindrical in cross-section and the first, second and third fluid outlets 318, 320 and 356 being in direct fluid communication with the generally cylindrical portion 314a. Also, as shown, the first, second, and third fluid outlets 318, 320 and 356 are in indirect fluid communication with the fluid inlet 316 depending upon the relative positions of the first and second piston-like valve members 322 and 324.

As will be appreciated, the first and second piston-like valve members 322 and 324 are slidably mounted for reciprocating movement within the generally cylindrical portion 314a of the chamber 314, and the biasing means or spring 326 is disposed within the enlarged cavity portion 314b to apply the biasing force against at least one of the first and second piston-like valve members 322 and 324. In the embodiment illustrated in FIG. 4, the second piston-like valve member 324 includes an axial extension 328 disposed in the enlarged cavity portion 314b of the chamber 314 and the spring 326 applies the biasing force against the axial extension 328 to urge the first and second piston-like valve members 322 and 324 toward the first positions thereof.

As shown, the multiple port relief valve 310 includes means such as the threaded cap 330 for retaining the spring 326 in the enlarged cavity portion 314b of the chamber 314. In this connection, the axial extension 328 of the second piston-like valve member 324 preferably includes a radial flange 328a dimensioned larger than the generally cylindrical portion 314a and disposed such that the spring 326 normally urges the radial flange 328a into engagement with a wall 332 of the enlarged cavity portion 314b disposed generally transversely about the generally cylindrical portion 314a of the chamber 314. Additionally, the valve body 312 preferably includes a fluid vent 334 in direct fluid communication with the enlarged cavity portion 314b of the chamber 314.

Still referring to FIG. 4, the threaded cap 330 is preferably disposed in coaxial relation to the fluid inlet 316, the generally cylindrical portion 314a, and the enlarged cavity portion 314b of the chamber 314. It will be appreciated that the threaded cap 330 has threads 330a adapted to cooperate with mating threads 336a in an opening 336 leading into the enlarged cavity 314b of the chamber 314. With this construction, the first piston-like valve member 322, second piston-like valve member 324, and spring 326 can be placed in position through the opening 336 and thereafter retained in position by utilizing the threaded cap 330.

In operation of the FIG. 4 embodiment, scavenge oil pressure is again initially transmitted to the inlet end of the first piston-like valve member 322 as indicated by the arrow. During a rapid increase in pressure which is typical of a cold start overpressure condition, the fluid pressure at the inlet end of the first piston-like valve member 322 will act to move both the first and second piston-like valve members 322 and 324 against the biasing force of the spring 326. The first piston-like valve member 322 will stop when the first fluid outlet 318 in the valve body 312 is exposed such that the oil flowing through the fluid outlet 318 causes the resulting fluid pressure to balance the biasing force of the spring 326. At this point, the abutting shoulder portions 322b and 324b will be aligned with the second fluid outlet 320 which will normally be at a lower pressure than the fluid pressure in the fluid inlet 316 assuring that the combined effect of the fluid pressure on the first piston-like valve member and the biasing force of the spring 326 on the second piston-like valve member 324 will maintain the shoulder portions 322b and 324b in abutting relation. As a result, the multiple port relief valve 310 continues to relieve fluid pressure through the first fluid outlet 318 until the fluid pressure can no longer balance the baising force of the spring 326 at which time both the first and second piston-like valve members 322 and 324 move back toward the fluid inlet 316 once again closing the first fluid outlet 318 with the first piston-like valve member 322 in engagement with the ring 338, as illustrated.

During a gradual increase in pressure which is typical of a plugging filter, the areas between the first and second piston-like valve members 322 and 324 also build up in pressure because of oil leakage through the radial bores 346. The first piston-like valve member 322 is maintained in engagement with the ring 338 by this gradual increase in pressure in combination with the biasing force of the spring 342, and the gradual increase in pressure fills the elongated axial bore 348 with oil to provide fluid pressure to act with the spring 342 to move the second piston-like valve member 324 independently of the first piston-like valve member 322 against the biasing force of the spring 326. As a result, the radial bores 346 in the first piston-like valve member 322 are disposed in communication with the second fluid outlet 320 to relieve overpressure by allowing oil to flow into the second fluid outlet 320.

The multiple port relief valve 310 continues to relieve through the second outlet 320 until there is an increase or decrease in the fluid pressure. In the event of a further increase in the gradually increasing pressure in the fluid inlet, the second piston-like valve member 324 is caused to move independently still further from the first piston-like valve member 322 from the second position to the third position thereof to permit fluid to flow from the fluid inlet 316 to both the second and third fluid outlets 320 and 356 thereby providing a pressure regulating feature to ensure that fluid pressure in the fluid outlet 320 does not reach a dangerously high level. In the event of a decrease in the gradually increasing pressure in the fluid inlet, the first and second piston-like valve members 322 and 324 move back toward the fluid inlet 316 eventually once again closing all of the first, second and third fluid outlets 318, 320 and 326 with the shoulders 322b and 324b in abutment and the first piston-like valve member 322 in engagement with the ring 338. As will be appreciated, this occurs because the fluid pressure in combination with the biasing force of the spring 342 can no longer balance the biasing force of the spring 326.

Still referring to FIG. 4, it will be appreciated that the third fluid outlet 356 is displaced axially from the second fluid outlet 320. This axial displacement results in the second fluid outlet 320 being opened in response to movement of the second piston-like valve member 324 relative to the first piston-like valve member 322 prior to opening of the third fluid outlet 356, thus allowing the multiple port relief valve 310 to function not only as an overpressure relief valve but also as a regulating valve. As a result, the first fluid outlet 318 comprises a rapid overpressure relief port, the second fluid outlet 320 comprises a gradual overpressure relief port, and the third fluid outlet 356 comprises a pressure regulating port.

In a hydraulic system, the multiple port relief valve 310 will relieve through the first fluid outlet 318 to the inlet of a scavenge pump during cold starts or any other short term overpressure condition. This will, of course, help to decongeal the inlet oil in the case of a cold start and, in any case, the external circuit will be protected against overpressure by reason of the first fluid outlet 318. If the overpressure condition is long-term such as with a plugged filter or cooler, the multiple port relief valve 310 will relieve through the second fluid outlet 320 to supply the long-term needs of the lubrication or power hydraulic section of a charged circuit.

In some cases, oil cleanliness in the power hydraulic section of the charge circuit is a major concern. The second fluid outlet 320 can then be directed only to those portions of the charge circuit which can be made less sensitive to unfiltered oil including, for instance, the lubrication circuit. With less concern about using unfiltered oil, the second fluid outlet 320 can be utilized to direct oil directly into the charge line after the charge pump.

With the present invention, a new and improved relief valve has been provided. It will also be appreciated that the invention provides a multiple port relief valve whereby a rapid increase in pressure in the fluid inlet permits fluid to flow from the fluid inlet to a first fluid outlet, and the valve can be designed to stay in relief through the first fluid outlet or slowly change from relieving from the first fluid outlet to relieving from the second fluid outlet by the use of orifices and other means of changing the pressure build-up and force balance between the first and second piston-like valve members. Moreover, the present invention provides a multiple port relief valve whereby a gradual increase in pressure in the fluid inlet permits fluid to flow from the fluid inlet to a second fluid outlet.

While in the foregoing there has been set forth a preferred embodiment of the invention, it is to be understood that the invention is only to be limited by the spirit and scope of the appended claims.

I claim:

1. A multiple port relief valve, comprising:
    a valve body defining a chamber having a fluid inlet and having a first fluid outlet and a second fluid outlet in fluid communication therewith;
    a first piston-like valve member disposed in said chamber for movement between a first position preventing fluid communication between said fluid inlet and said first fluid outlet and a second position accommodating fluid communication between said fluid inlet and said first fluid outlet;
    a second piston-like valve member disposed in said chamber for movement between a first position preventing fluid communication between said fluid inlet and said second fluid outlet and a second position accommodating fluid communication between said fluid inlet and said second fluid outlet; and
    biasing means in said valve body applying a biasing force tending to maintain at least said first piston-like valve member in said first position thereof, said first and second piston-like valve members moving together against said biasing means when said first piston-like valve member moves from said first position to said second position, said first and second piston-like valve members moving away from one another when said second piston-like valve member moves from said first position to said second position;
    said first and second piston-like valve members being in selective fluid communication with said fluid inlet;
    whereby a rapid increase in pressure in said fluid inlet causes said first piston-like valve member to move with said second piston-like valve member from said first position to said second position thereof to permit fluid to flow from said fluid inlet to said first fluid outlet and a gradual increase in pressure in said fluid inlet causes said second piston-like valve member to move independently of said first piston-like valve member from said first position to said second position thereof to permit fluid to flow from said fluid inlet to said second rluid outlet.

2. The multiple port relief valve as defined by claim 1 wherein said chamber in said valve body includes a generally cylindrical portion in direct fluid communication with said fluid inlet and an enlarged cavity portion in direct fluid communication with said generally cylindrical portion in remote relation to said fluid inlet.

3. The multiple port relief valve as defined by claim 2 wherein said fluid inlet, generally cylindrical portion, and enlarged cavity portion are disposed in generally coaxial relation, said enlarged cavity portion being generally cylindrical in cross section, said first and second fluid outlets being in direct fluid communication with said generally cylindrical portion.

4. The multiple port relief valve as defined by claim 3 wherein said first and second piston-like valve members are slidably mounted for reciprocating movement within said generally cylindrical portion, said biasing means including a spring disposed within said enlarged cavity portion to apply said biasing force against at least one of said first and second piston-like valve members.

5. The multiple port relief valve as defined by claim 4 wherein said second piston-like valve member includes an axial extension disposed in said enlarged cavity portion with said spring applying said biasing force against said axial extension, and including means for retaining said spring in said enlarged cavity portion in a position tending to maintain at least said first piston-like valve member in said first position thereof.

6. The multiple port relief valve as defined by claim 5 wherein said axial extension of said second piston-like valve member includes a radial flange dimensioned larger than said generally cylindrical portion of said chamber, said spring normally urging said radial flange into engagement with a wall of said enlarged cavity portion of said chamber disposed generally transversely about said generally cylindrical portion of said chamber.

7. The multiple port relief valve as defined by claim 5 wherein said valve body includes a fluid vent in direct fluid communication with said enlarged cavity portion of said chamber, said spring retaining means including a threaded cap to be disposed in coaxial relation to said fluid inlet, generally cylindrical portion, and enlarged cavity portion, said threaded cap being adapted to cooperate with mating threads in an opening leading into said enlarged cavity portion of said chamber.

8. The multiple port relief valve as defined by claim 4 wherein said first piston-like valve member includes an axial extension disposed in said enlarged cavity portion with said spring applying said biasing force against said axial extension, and including means for retaining said spring in said enlarged cavity portion in a position tending to maintain at least said first piston-like valve member in said first position thereof.

9. The multiple port relief valve as defined by claim 8 wherein said axial extension of said first piston-like valve member includes a radial flange dimensioned larger than said generally cylindrical portion of said chamber, said spring normally urging said radial flange into engagement with a wall of said enlarged cavity portion of said chamber disposed generally transversely about said generally cylindrical portion of said chamber.

10. The multiple port relief valve as defined by claim 8 wherein said valve body includes a fluid vent in direct fluid communication with said enlarged cavity portion of said chamber, said spring retaining means including a threaded cap to be disposed in coaxial relation to said fluid inlet, generally cylindrical portion, and enlarged cavity portion, said threaded cap being adapted to cooperate with mating threads in an opening leading into said enlarged cavity portion of said chamber.

11. A multiple port relief valve, comprising:
a valve body defining a chamber having a fluid inlet and having a first fluid outlet and a second fluid outlet in fluid communication therewith;
a first piston-like valve member disposed in said chamber for movement between a first position preventing fluid communication between said fluid inlet and said first fluid outlet and a second position accommodating fluid communication between said fluid inlet and said first fluid outlet;
a second piston-like valve member disposed in said chamber for movement between a first position preventing fluid communication between said fluid inlet and said second fluid outlet and a second position accommodating fluid communication between said fluid inlet and said second fluid outlet;
first biasing means in said valve body applying a biasing force tending to maintain said first piston-like valve member in said first position thereof, said first and second piston-like valve members moving together against said biasing means when said first piston-like valve member moves from said first position to said second position; and
second biasing means in said valve body applying a biasing force tending to move said second piston-like valve member toward said second position thereof, said first and second piston-like valve members moving away from one another when said second piston-like valve member moves from said first position to said second position;
said biasing force of said first biasing means being greater than said biasing force of said second biasing means;
said first piston-like valve member being in direct fluid communication with said fluid inlet and said second piston-like valve member being in fluid communication with said fluid inlet through said first piston-like valve member;
whereby a rapid increase in pressure in said fluid inlet causes said first piston-like valve member to move with said second piston-like valve member from said first position to said second position thereof to permit fluid to flow from said fluid inlet to said first fluid outlet and a gradual increase in pressure in said fluid inlet causes said second piston-like valve member to move independently of said first piston-like valve member from said first position to said second position thereof to permit fluid to flow from said fluid inlet to said second fluid outlet.

12. The multiple port relief valve as defined by claim 11 wherein said chamber in said valve body includes a generally cylindrical portion in direct fluid communication with said fluid inlet and an enlarged cavity portion in direct fluid communication with said generally cylindrical portion in remote relation to said fluid inlet.

13. The multiple port relief valve as defined by claim 12 wherein said fluid inlet, generally cylindrical portion, and enlarged cavity portion are disposed in generally coaxial relation, said enlarged cavity portion being generally cylindrical in cross section, said first and second outlets being in direct fluid communication with said generally cylindrical portion.

14. The multiple port relief valve as defined by claim 13 wherein said first and second piston-like valve members are slidably mounted for reciprocating movement within said generally cylindrical portion, said first biasing means including a spring disposed within said enlarged cavity portion to apply said biasing force tending to maintain said first and second piston-like valve members in said first positions thereof.

15. The multiple port relief valve as defined by claim 14 wherein said second piston-like valve member includes an elongated axial bore facing said first piston-like valve member, said second biasing means including a spring disposed within said elongated axial bore to apply said biasing force tending to move said second piston-like valve member toward said second position thereof.

16. The multiple port relief valve as defined by claim 15 wherein said first piston-like valve member includes an axially extending portion of reduced diameter adapted to be slidably disposed within said elongated axial bore in said second piston-like valve member, said spring in said elongated axial bore in said second piston-like valve member acting against said first piston-like valve member to tend to move said second piston-like valve member to said second position thereof.

17. The multiple port relief valve as defined by claim 16 wherein said first piston-like valve member includes an axial bore facing said fluid inlet and at least one radial bore in said reduced diameter portion, said radial bore being in direct fluid communication with said axial bore, said radial bore permitting fluid to flow from said fluid inlet, through said axial and radial bores in said first piston-like valve member, and to said second fluid outlet when said second piston-like valve member has moved independently of said first piston-like valve member to said second position thereof.

18. The multiple port relief valve as defined by claim 17 wherein said first and second piston-like valve members include shoulder portions disposed in abutting relation in said first positions thereof, said shoulder portions being disposed in spaced relation to permit said radial bore to be in fluid communication with said second fluid outlet when said second piston-like valve member has moved independently of said first piston-like valve member to said second position thereof.

19. The multiple port relief valve as defined by claim 18 wherein said first piston-like valve member includes a fluid passage extending from said axial bore in said first piston-like valve member to said abutting shoulder portions to supply fluid pressure thereto, said second piston-like valve member moving independently of said first piston-like valve member from said first position to said second position as a gradual increase in pressure in said fluid inlet is transferred to said second piston-like valve member through said fluid passage.

20. The multiple port relief valve as defined by claim 17 including an axial fluid passage extending from said axial bore completely through said first piston-like valve member to permit said elongated axial bore in said second piston-like valve member to be in fluid communication with said fluid inlet through said first piston-like valve member, said second piston-like valve member moving independently of said first piston-like valve member from said first position to said second position as a gradual increase in pressure in said fluid inlet is transferred to said second piston-like valve member through said fluid passage.

21. The multiple port relief valve as defined by claim 20 including a fluid passage extending from said elongated axial bore completely through said second piston-like valve member to permit said enlarged cavity portion of said chamber to be in fluid communication with said fluid inlet through said axial bore and said axial fluid passage in said first piston-like valve member and through said elongated axial bore and said fluid passage in said second piston-like valve member.

22. The multiple port relief valve as defined by claim 21 wherein said springs are formed of shape memory metal, said springs applying a greater biasing force as fluid temperature increases.

23. A multiple port relief valve, comprising:
a valve body defining a chamber having a fluid inlet and having a first fluid outlet and a second fluid outlet in fluid communication therewith;
a first piston-like valve member disposed in said chamber for movement between a first position preventing fluid communication between said fluid inlet and said first fluid outlet and a second position accommodating fluid communication between said fluid inlet and said first fluid outlet;
a second piston-like valve member disposed in said chamber for movement between a first position preventing fluid communication between said fluid inlet and said second fluid outlet and a second position accommodating fluid communication between said fluid inlet and said second fluid outlet;
first biasing means in said valve body applying a biasing force tending to maintain said first piston-like valve member in said first position thereof, said first and second piston-like valve members moving together against said biasing means when said first piston-like valve member moves from said first position to said second position; and
second biasing means in said valve body applying a biasing force tending to maintain said second piston-like valve member in said first position thereof, said second piston-like valve member moving relative to said first piston-like valve member when said second piston-like valve member moves from said first position to said second position thereof;
said biasing force of said first biasing means being greater than said biasing force of said second biasing means;
said first and second piston-like valve members being in direct fluid communication with said fluid inlet, said first piston-like valve member also being in fluid communication with said fluid inlet through said second piston-like valve member;
whereby a rapid increase in pressure in said fluid inlet causes said first piston-like valve member to move with said second piston-like valve member from said first position to said second position thereof to permit fluid to flow from said fluid inlet to said first fluid outlet and a gradual increase in pressure in said fluid inlet causes said second piston-like valve member to move independently of said first piston-like valve member from said first position to said second position thereof to permit fluid to flow from said fluid inlet to said second fluid outlet.

24. The multiple port relief valve as defined by claim 23 wherein said chamber in said valve body includes a generally cylindrical portion in direct fluid communication with said fluid inlet and an enlarged cavity portion in direct fluid communication with said generally cylindrical portion in remote relation to said fluid inlet.

25. The multiple port relief valve as defined by claim 24 wherein said fluid inlet, generally cylindrical portion, and enlarged cavity portion are disposed in generally coaxial relation, said enlarged cavity portion being generally cylindrical in cross-section, said first and second fluid outlets being in direct fluid communication with said generally cylindrical portion.

26. The multiple port relief valve as defined by claim 25 wherein said first piston-like valve member is slidably mounted for reciprocating movement within said generally cylindrical portion, said first piston-like valve member having an elongated axial bore facing said fluid inlet, said second piston-like valve member being slidably mounted for reciprocating movement within said elongated axial bore in said first piston-like valve member.

27. The multiple port relief valve as defined by claim 26 wherein said first biasing means includes a spring disposed within said enlarged cavity portion to apply said biasing force tending to maintain said first piston-like valve member in said first position thereof, said second biasing means including a spring disposed within said elongated axial bore to apply said biasing force tending to maintain said second piston-like valve member in said first position thereof.

28. The multiple port relief valve as defined by claim 27 wherein said second piston-like valve member includes an axial bore facing said fluid inlet, said first piston-like valve member having at least one radial bore normally blocked by said second piston-like valve member from communication with said fluid inlet, said radial bore permitting fluid to flow from said fluid inlet, through said radial bore, and into said second fluid outlet when said second piston-like valve member has moved independently of said first piston-like valve member to said second position thereof.

29. The multiple port relief valve as defined by claim 28 including an axial fluid passage extending from said elongated axial bore completely through said first piston-like valve member to permit said enlarged cavity portion of said chamber to be in fluid communication with said fluid inlet through said axial bore in said second piston-like valve member and said elongated axial bore in said first piston-like valve member.

30. The multiple port relief valve as defined by claim 26 wherein said first piston-like valve member includes a radially inwardly projecting shoulder for retaining said second piston-like valve member within said elongated axial bore.

31. A multiple port relief valve, comprising:
  a valve body defining a chamber having a fluid inlet and having a first fluid outlet, a second fluid outlet, and a third fluid outlet in fluid communication therewith;
  a first piston-like valve member disposed in said chamber for movement between a first position preventing fluid communication between said fluid inlet and said first fluid outlet and a second position accommodating fluid communication between said fluid inlet and said first fluid outlet;
  a second piston-like valve member disposed in said chamber for movement between a first position preventing fluid communication between said fluid inlet and said second and third fluid outlets, a second position accommodating fluid communication between said fluid inlet and said second fluid outlet, and a third position accommodating fluid communication between said fluid inlet and said second and third fluid outlets; and
  biasing means in said valve body applying a biasing force tending to maintain at least said first piston-like valve member in said first position thereof, said first and second piston-like valve members moving together against said biasing means when said first piston-like valve member moves from said first position to said second position, said first and second piston-like valve members moving away from one another when said second piston-like valve members moves from said first position to said second and third positions;
  said first and second piston-like valve members being in selective fluid communication with said fluid inlet;
  whereby a rapid increase in pressure in said fluid inlet causes said first piston-like valve member to move with said second piston-like valve member from said first position to said second position thereof to permit fluid to flow from said fluid inlet to said first fluid outlet, a gradual increase in pressure in said fluid inlet causes said second piston-like valve member to move independently of said first piston-like valve member from said first position to said second position thereof to permit fluid to flow from said fluid inlet to said second fluid outlet, and further increases in said gradually increasing pressure in said fluid inlet causes said second piston-like valve member to move independently of said first piston-valve member from said second position to said third position thereof to permit fluid to flow from said fluid inlet to said second and third fluid outlets.

32. The multiple port relief valve as defined by claim 31 wherein said chamber in said valve body includes a generally cylindrical portion in direct fluid communication with said fluid inlet and an enlarged cavity portion in direct fluid communication with said generally cylindrical portion in remote relation to said fluid inlet.

33. The multiple port relief valve as defined by claim 32 wherein said fluid inlet, generally cylindrical portion, and enlarged cavity portion are disposed in generally coaxial relation, said enlarged cavity portion being generally cylindrical in cross-section, said first, second and third fluid outlets being in direct fluid communication with said generally cylindrical portion.

34. The multiple port relief valve as defined by claim 33 wherein said first and second piston-like valve members are slidably mounted for reciprocating movement within said generally cylindrical portion, said biasing means including a spring disposed within said enlarged cavity portion to apply said biasing force against at least one of said first and second piston-like valve members.

35. The multiple port relief valve as defined by claim 34 wherein said second piston-like valve member includes an axial extension disposed in said enlarged cavity portion with said spring applying said biasing force against said axial extension, and including means for retaining said spring in said enlarged cavity portion in a position tending to maintain at least said first piston-like valve member in said first position thereof.

36. The multiple port relief valve as defined by claim 35 wherein said axial extension of said piston-like valve member includes a radial flange dimensioned larger than said generally cylindrical portion of said chamber, said spring normally urging said radial flange into engagement with a wall of said enlarged cavity portion of said chamber disposed generally transversely about said generally cylindrical portion of said chamber.

37. The multiple port relief valve as defined by claim 35 wherein said valve body includes a fluid vent in direct fluid communication with said enlarged cavity portion of said chamber, said spring retaining means including a threaded cap to be disposed in coaxial relation to said fluid inlet, generally cylindrical portion, and enlarged cavity portion, said threaded cap being adapted to cooperate with mating threads in an opening leading into said enlarged cavity portion of said chamber.

38. The multiple port relief valve as defined by claim 34 wherein said first piston-like valve member includes an axial extension disposed in said enlarged cavity portion with said spring applying said biasing force against said axial extension, and including means for retaining said spring in said enlarged cavity portion in a position tending to maintain at least said first piston-like valve member in said first position thereof.

39. The multiple port relief valve as defined by claim 38 wherein said axial extension of said first piston-like valve member includes a radial flange dimensioned larger than said generally cylindrical portion of said chamber, said spring normally urging said radial flange into engagement with a wall of said enlarged cavity portion of said chamber disposed generally transversely about said generally cylindrical portion of said chamber.

40. The multiple port relief valve as defined by claim 31 wherein said first fluid outlet is a rapid overpressure relief port, said second fluid outlet is a gradual overpressure relief port, and said third fluid outlet is a pressure regulating port.

* * * * *